Aug. 5, 1958

R. W. SMITH 2,846,186

VEHICLE-HANDLING AND TRANSFER DOLLY
FOR MECHANICAL PARKING GARAGES

Filed Dec. 3, 1956

INVENTOR
Robert W. Smith

BY W. S. Rambo

ATTORNEY

Aug. 5, 1958

R. W. SMITH 2,846,186

VEHICLE-HANDLING AND TRANSFER DOLLY
FOR MECHANICAL PARKING GARAGES

Filed Dec. 3, 1956

INVENTOR
Robert W. Smith
BY W. S. Rambo
ATTORNEY

INVENTOR
Robert W. Smith

BY W. H. Rambo

ATTORNEY

INVENTOR
Robert W. Smith
BY
ATTORNEY

United States Patent Office 2,846,186
Patented Aug. 5, 1958

2,846,186

VEHICLE-HANDLING AND TRANSFER DOLLY FOR MECHANICAL PARKING GARAGES

Robert W. Smith, Columbus, Ohio, assignor to Dresser-Ideco Company, Columbus, Ohio, a corporation of Ohio Application December 3, 1956, Serial No. 626,045

7 Claims. (Cl. 254—2)

The present invention relates generally to vehicle parking garages of the so-called mechanical type, and more particularly to an improved vehicle-handling or transferring dolly employed in transferring a vehicle to and from an elevator employed in a mechanical garage system.

In the past, many and various types of so-called mechanical parking garages or systems have been proposed, wherein a building structure comprising a multiplicity of vertically superposed, laterally adjacent, vehicle-receiving stalls is provided in combination with a vertically and horizontally movable elevator apparatus operable to move vehicles simultaneously or selectively in both horizontal and vertical planes to bring the same into desired registry with the individual parking stalls or spaces. Such systems have also proposed the use of various types of vehicle-transferring apparatus operable to transfer a vehicle to be parked from a loading station onto the elevator and from the elevator into a pre-selected parking stall, and thereafter, to remove the parked vehicle from the stall onto the elevator and thence from the elevator to a discharge or exit station.

When considering the volume or number of vehicles to be serviced in a relatively large capacity mechanical parking garage, it will readily be appreciated that, for the sake of efficiency, the elevator mechanism and vehicle transfer apparatus must function in a rapid and expeditious manner both in parking the vehicles and in discharging the same, particularly during peak periods of operation. One of the primary difficulties attendant to prior art mechanical parking systems stems from the inefficiency and relative slowness of operation of the vehicle-handling or transfer apparatus employed in transferring vehicles to and from the associated elevator mechanism.

Prior vehicle-handling or transferring apparatus employed in mechanical parking garages generally rely for their efficient operation upon the dexterity and skill of the operator or attendant personnel and, as a consequence, the operation of transferring vehicles to and from the elevator is slowed to the point of inefficiency, due to the extreme care and attention required of the operator in visually indexing or referencing the vehicle transfer apparatus with an associated vehicle, otherwise, careless or hurried operation on the part of the operator or attendant personnel results in considerable damage to vehicles, thus rendering the overall systems objectionable.

It follows, therefore, that the primary object of the present invention is to provide an improved vehicle-handling or transferring dolly apparatus for use in combination with the elevator component of a mechanical parking garage, and wherein such dolly mechanism is substantially fully automatic in the operation of properly positioning itself beneath, and in elevating, an associated vehicle to enable the same to be transferred to and from the associated elevator apparatus, thus minimizing the possibility of human error in properly positioning such transferring mechanism with attendant danger of damage to the vehicle, while at the same time performing the desired transfer or handling operation in a quick and expeditious manner.

It is another object of the present invention to provide an improved vehicle-handling and transfer apparatus for mechanical parking garages which comprises a self-propelled, track-guided dolly or carriage member arranged to move off of an associated elevator platform to either side thereof, and under an associated vehicle, and thereafter to automatically determine or measure the wheel base of the particular vehicle, thereafter elevate or lift the same off the ground or floor by engagement with the axle housings of the vehicle, or other proper stationary frame components, without possible damage to the vehicle or its accessory components, and to thereafter transfer such vehicle in its raised position to and from the associated elevator apparatus for movement between appropriate loading, parking, and unloading stations within the garage structure.

Yet a further object of this invention is to provide a vehicle-transferring and handling mechanism of the character described which comprises a relatively elongated, rectangular dolly or carriage frame provided at the corners thereof with relatively extensible and retractable vehicle-lifting jacks operable in response to a substantially automatic fluid-actuated control system to be brought into proper vertical alignment with stationary frame components of an associated vehicle, and to thereafter lift or raise the vehicle bodily a distance sufficient to disengage the ground wheels to the vehicle from the associated floor or ground surface to thus support the vehicle for movement in association with the self-propelled dolly or carriage frame, onto and off of an associated elevator platform.

With these and other objects and advantages in view, a more complete understanding of the present invention may be had by reference to the following description, appended claims, and the accompanying drawings, wherein:

Figure 1:
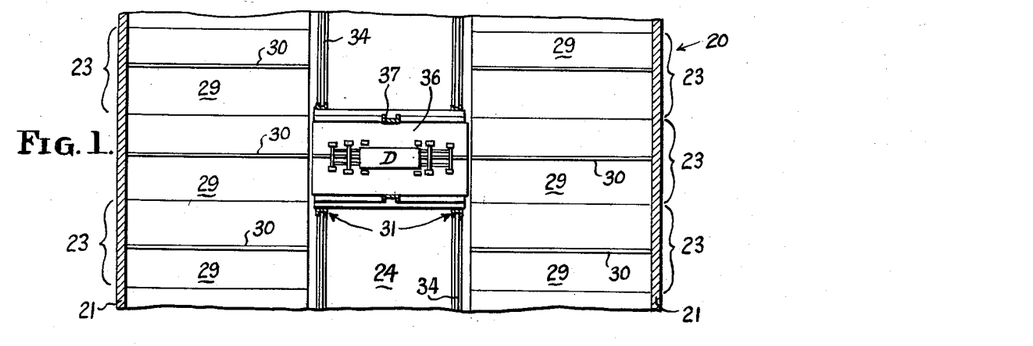
Fig. 1 is a fragmentary, diagrammatic top plan view of a form of building structure and elevator apparatus employed in a mechanical parking garage, and illustrating the present improved vehicle-handling and transferring dolly in its operative position upon the associated elevator platform.
Figure 2:
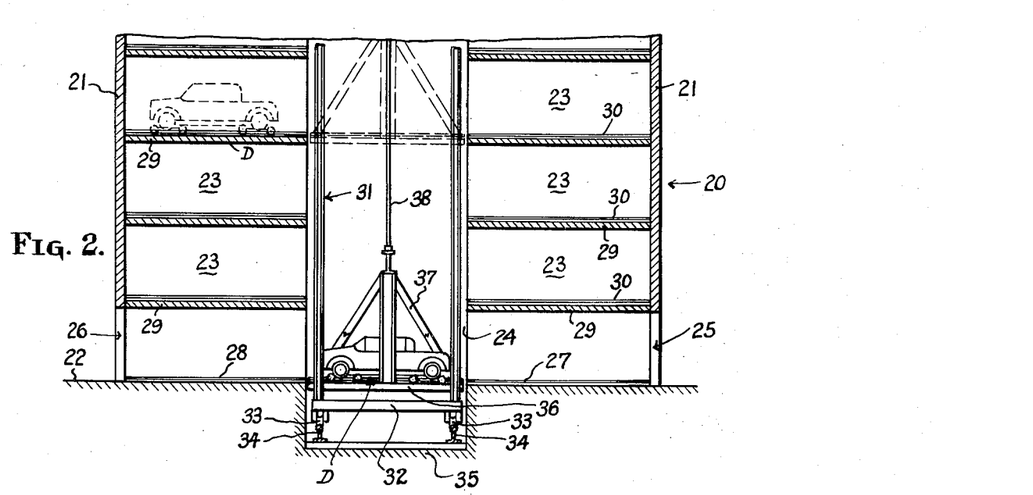
Fig. 2 is a transverse vertical sectional view taken through a mechanical parking garage and illustrating the operative relationship between the present improved vehicle-handling and transferring dolly, the elevator platform, and the building structure.

Referring now to the drawings, and more particularly to Figs. 1 and 2 thereof, a parking garage building structure is illustrated generally by reference numeral 20. In the form of building structure illustrated in Figs. 1 and 2, the same comprises vertically arranged outer walls 21 extending upwardly from a floor or ground level 22. The building structure further provides a multiplicity of individual parking stalls 23 preferably arranged in elevated relation to the first floor or ground level of the building structure. The individual stalls 23, at each floor level, are arranged in horizontal rows or banks disposed on each side of and adjacent to a centrally arranged elevator shaft or passageway 24 which extends longitudinally of the building structure from one end thereof to the other. Advantageously, the building structure is provided at the ground level 22 thereof with one or more entrance ways 25 into which automobiles or vehicles to be parked may be driven from the adjacent street or highway, and one or more exit ways 26 from which unparked or discharged vehicles may be driven from the building structure. For purposes of convenience, the ground floor area of the building structure adjacent the entrance way 25 will be hereinafter referred to as the loading station 27, while the area at the ground floor level adjacent the exit way 26 will be designated as the unloading station 28.

Each level of the building structure 20 is provided with suitable floor surfaces 29 which may be continuous in area as between the individual parking stalls of the building and appropriately supported by suitable structural beams and columns, not shown. Mounted centrally and longitudinally upon the floor 29 of each parking stall 23 and the floors of the loading and unloading stations 27 and 28 is a single upstanding guide rail 30 which, as will hereinafter be more fully explained, serves as a means to positively guide and maintain the vehicle-handling and transferring dolly in a straight line during its movement to and from the associated elevator apparatus.

Positioned within the elevator shaftway 24 and arranged for movement longitudinally thereof in a horizontal plane is an elevator-supporting tower structure 31 which extends the full height of the building structure. The elevator-supporting tower structure 31 comprises a base frame section 32 which may advantageously carry a plurality of spaced flanged wheels 33 mounted for rolling movement upon relatively stationary rails 34. As illustrated in Fig. 2 of the drawings, the rails 34 are mounted upon a suitable foundation 35 provided below the first floor level of the building structure, but if desired, it will be understood that the elevator tower structure 31 may be mounted at or in elevated relation to the first floor level, as for example, at the second floor level, when it is desired to provide free passage area between opposite sides of the building structure at the first floor level and on either side of the loading and unloading stations 27 and 28.

Mounted for guided vertical movement within the elevator-supporting tower structure 31 is an elevator platform 36. The platform 36 is provided on either side with suitable diagonally and upwardly extending supporting braces 37 which are connected with hoisting cables 38 adapted to be retracted and extended relative to the elevator tower structure, by appropriate power-driven hoisting apparatus mounted at the upper end of the tower structure, not shown. Advantageously, one or more of the flanged wheels 33, carried at the base section of the elevator-supporting tower 31, may be driven in rotation by appropriate drive means, not shown, in order that the elevator-supporting tower structure may be driven bodily longitudinally and horizontally of the shaft or passageway 24.

Thus, it will readily be understood by those skilled in the art, that the elevator platform 36 is arranged for simultaneous movement in both horizontal and vertical planes relative to the building structure through simultaneous operation of the drive mechanisms associated with the traction wheels 33 and the hoisting cables 38, such drive mechanisms preferably being under the control of a single operator stationed upon the elevator apparatus. It will here be understood that the structure and mechanism heretofore described, with the exception of the guide rails 30 located within the individual parking stalls 23, is common to present day mechanical parking garages, and is shown and described in various previously issued patents, and consequently, forms no part of the present invention, but is described herein solely for the purpose of facilitating a complete understanding of the present improved vehicle-handing and transferring apparatus.

In accordance with the present invention there is provided in association with the elevator platform 36, a self-propelled vehicle-handling and transferring carriage or dolly generally designated at D. Through the operation of the dolly D vehicles driven to and parked at the loading station 27 may be lifted bodily and transferred or moved onto the elevator platform 36, and thereafter through operation of the elevator mechanism, moved into registry with any one of the parking stalls 23, and then transferred from the elevator platform 36 to the floor structure 29 of the selected parking stall. Conversely, a vehicle may be removed from its parking stall 23 onto the elevator platform 36 and then lowered through the elevator mechanism into alignment with the unloading station 28 and thereafter transferred from the elevator platform 36 and deposited onto the unloading station 28 to be driven from the garage structure.

Figure 3:
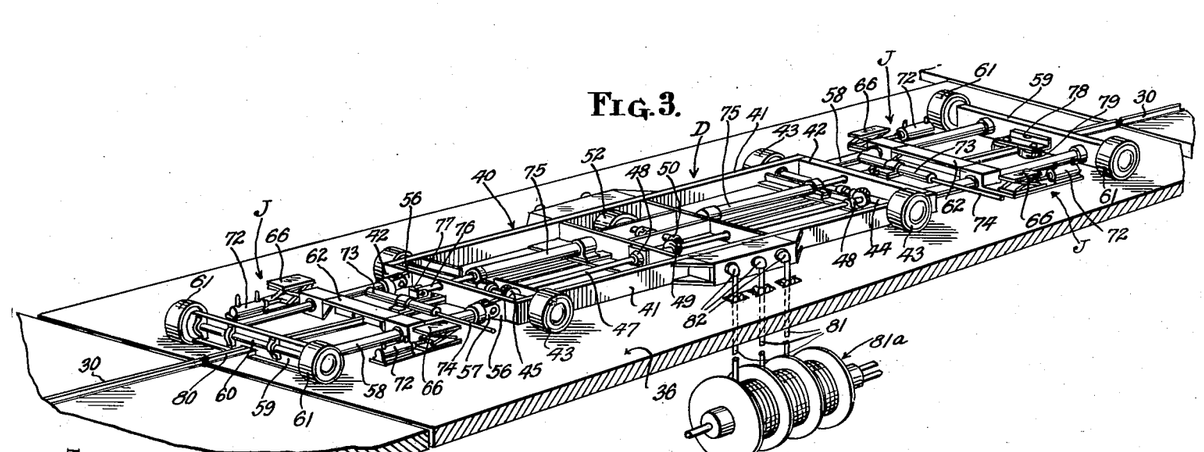
Fig. 3 is an enlarged perspective view of the present vehicle-handling and transferring dolly as the same occupies a position upon the elevator platform.
Figure 4:
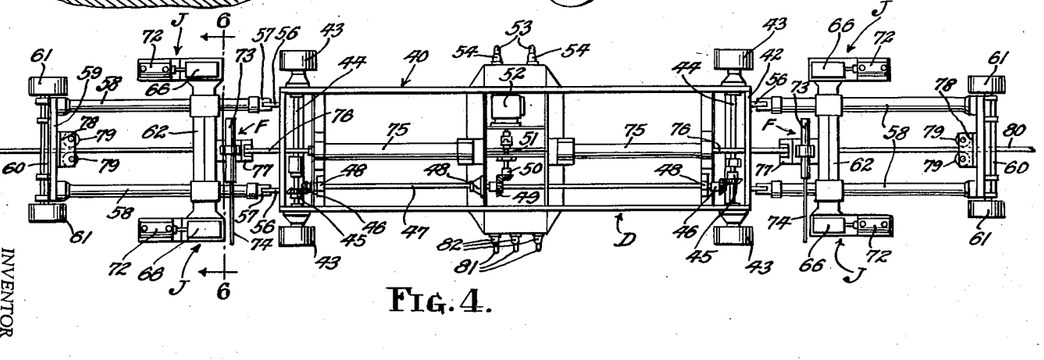
Fig. 4 is a top plan view of the dolly.
Figure 5:
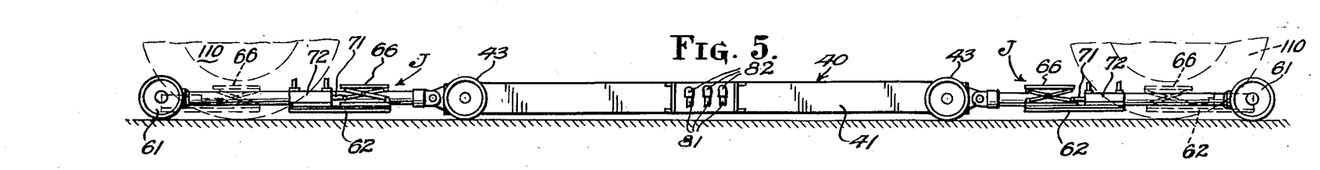
Fig. 5 is a side elevational view thereof.

With reference particularly to Figs. 3 and 4 of the drawings, the dolly D is so constructed as to provide a rectangular chassis or central frame section 40 comprising outer side members 41 connected at their ends by cross members 42. Advantageously, the side and end members 41 and 42 may be formed of relatively heavy channel iron construction with the end members welded, bolted or otherwise suitably secured in rigid relation to the side members 41. The chassis or central frame section 40 defines a relatively low, flat, box-like structure, and extending outwardly, approximately at the four corners of the chassis 40, are four traction wheels 43 drivingly carried upon axles 44 extending transversely through the chassis and appropriately journaled therein. Each of the axles 44 has keyed thereto a bevel gear 45 which is maintained in meshing engagement with a cooperative bevel gear 46 carried on an elongated drive shaft 47. The drive shaft 47 is journaled for rotation within bearings 48 mounted upon the cross members of the chassis, and has keyed to the intermediate portion thereof a second bevel gear 49. The gear 49 is maintained in meshing engagement with a cooperative gear 50 carried at the end of a relatively shorter driving shaft 51 drivingly coupled with the rotor element, not shown, of a reversible, rotary hydraulic motor 52. The motor 52 is stationarily mounted on one side of the chassis 40 and is supplied with operating pressure fluid through a pair of flexible hoses or conduits 53, the ends of which are connected with the inlet-outlet ports of the motor 52 by means of fluid-tight swivel couplings 54 mounted along one side of the chassis 40.

Thus, the dolly D is adapted to be propelled over the floor surface of the elevator platform 36 and the associated floor structures of the garage building and stalls upon the introduction of pressure fluid to the motor 52. Advantageously, the flexible conduit or hoses 53 employed in conducting pressure fluid toward and away from the motor 52, have their inner ends connected with the motor ports of a manually operable three-position reversing valve 55 (see Fig. 12) which is provided with an inlet port 55a connected to receive pressure fluid from a pump P1, and also having an exhaust port 55b connected to exhaust fluid to a reservoir R1. To provide for unhampered movement of the dolly D, the intermediate portions of the conduits 53 may advantageously be trained and wrapped about a suitable automatic rewind reel mechanism, not shown, which is positioned at a suitable location beneath the platform 36 of the elevator. In this manner, the conduits 53 will be maintained clear of the dolly structure during movement thereof to prevent entanglement of the hoses with the dolly and the traction wheels 43.

Extending outwardly from each of the end frame members 42 of the chassis 40 are a pair of transversely spaced vertically arranged hinge plates 56 to which are pivotally connected the clevis ends 57 of a pair of guide rods 58. The outer ends of the guides 58 are rigidly secured to cross beams 59 in each of which is journaled an axle 60 carrying at the outer ends thereof ground wheels 61. The hinged or pivotal connection between the hinge plates 56, carried by the central frame or chassis 40, and the clevis ends 57, provide for vertical articulating movement of the parallel guide rods 58 and their associated cross beams 59 relative to the central frame or chassis 40, whereby the traction wheels 43 will remain in contact with an associated supporting surface even though such surface be of an uneven or undulating character.

Slidably mounted on each set of guide rods 58 is a longitudinally movable jack-supporting frame 62 which carries at the ends thereof a pair of scissors-type jack assemblies designated generally by the reference character J.

Figure 6:
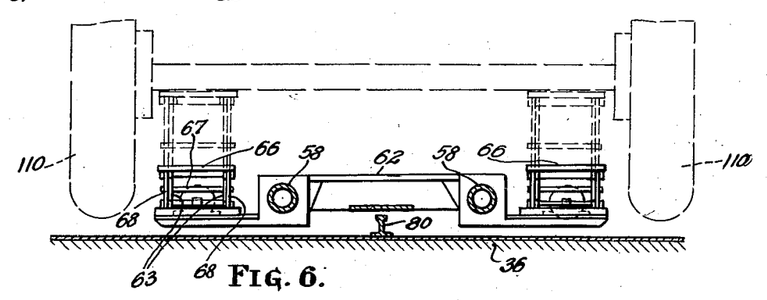
Fig. 6 is a transverse vertical sectional view taken along the line 6—6 of Fig. 4 and illustrating, particularly, the vehicle-lifting jacks employed on the present dolly.
Figure 7:
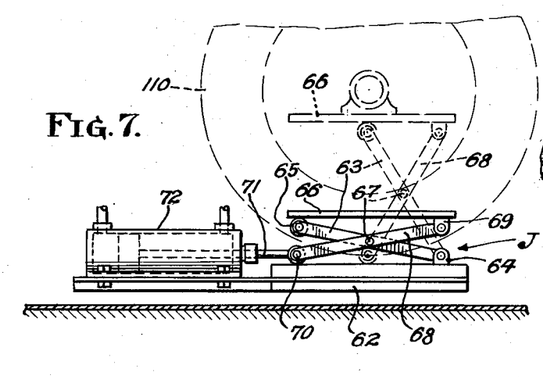
Fig. 7 is a detail side elevational view of one of the vehicle-lifting jacks of the dolly, illustrating in broken lines the elevated or raised position thereof.
Figure 8:
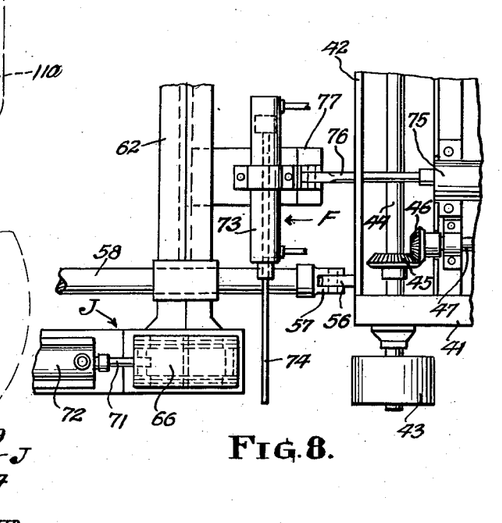
Fig. 8 is an enlarged fragmentary top plan view of one end portion of the dolly disclosing the relative position between the wheel base-determining feeler mechanism and the vehicle-lifting jacks.
Figure 9:
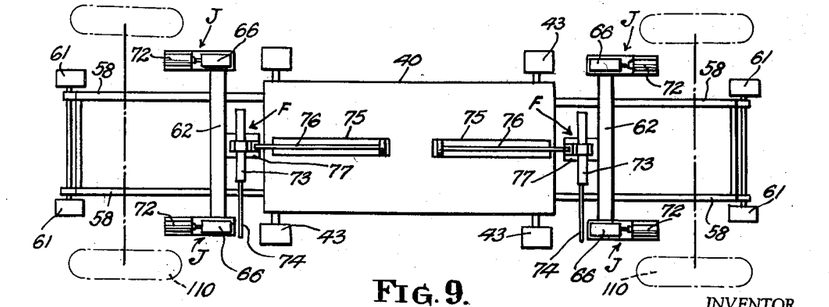
Fig. 9 is a diagrammatic top plan view of the vehicle-handling and transferring dolly as the same occupies an initial retracted position beneath an associated vehicle.

As shown particularly in Fig. 7 of the drawings, each jack assembly J comprises a first pair of levers 63 which are pivotally secured at their lower ends to clevis lugs 64 stationarily carried on the jack frame 62. The opposite ends of the levers 63 carry therebetween an anti-friction roller 65 upon which one end of a lift pad or plate 66 is slidably supported. The levers 63 are pivotally connected intermediate their ends, by means of a pin 67, with the intermediate region of a second pair of levers 68. The upper ends of the levers 68 are pivotally connected with a pair of spaced depending ears 69 secured to the lower opposite end surface of the pad 66. The lower ends of the second pair of levers 68 are joined by means of a roller pin 70 with the outer end of a piston rod 71 of a double acting hydraulic motor or ram 72. Thus, it will be seen, that reciprocation of the piston and piston rod 71 of the hydraulic motor 72 will impart upward and downward movement to the lift pad 66, to enable the jack assemblies J to elevate and lower an associated vehicle, as illustrated in broken lines in Figs. 6 and 7.

Figure 11:
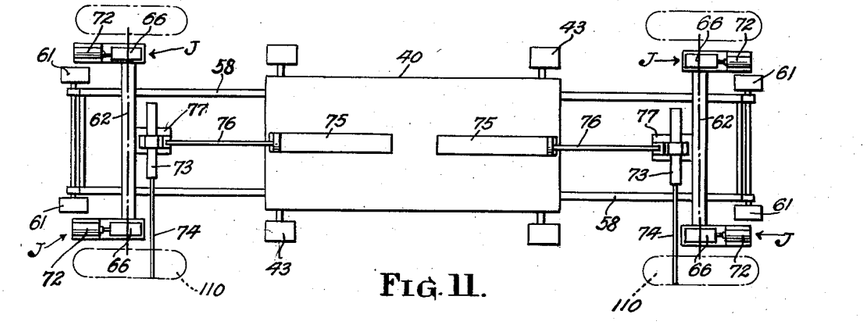
Fig. 11 is a similar view showing the position of the vehicle-lifting jacks at the point of engagement of the wheel base-determining feeler mechanism with the wheels of the vehicle.

Also carried on each of the jack frames 62 is a wheel base-determining feeler assembly F. Each feeler assembly comprises a double acting hydraulic ram or motor 73 stationarily mounted on the jack frame 62 rearwardly or inwardly of the jack assemblies J. Each of the rams 73 is provided with a relatively elongated feeler rod 74 having its inner end connected with the piston element of the ram and its outer end extending transversely or laterally with respect to the dolly D. The length of the feeler rod 74 is such that when the ram 73 is retracted, the end of the feeler rod 74 occupies a position within the outer boundaries of the dolly, as defined by the outermost projection of the ground wheels 43. However, upon extension, the feeler rods 74 are arranged to project a distance substantially outwardly beyond the plane of projection of the ground wheels 43 to an extent sufficient to engage the wheels or tires of a vehicle under which the dolly is driven, as will be more fully explained, and as shown in Fig. 11.

Carried along the longitudinal center line or axis of the central chassis 40 of the dolly are a pair of opposed fluid-actuated, double acting, jack-extending rams 75. Each of the rams 75 is provided with a relatively elongated extensible piston rod 76 which extends outwardly beyond the end frame members 42 of the central chassis and is pivotally connected with a clevis bracket 77 carried by the jack frame 62. Thus, the extension rams 75 are operable to move the jack frame 62 and its associated jack assemblies J and feeler assemblies F longitudinally on the guide rods 58 between relatively extended and retracted positions, in order to bring the jack assemblies J into desired vertical alignment or registry with stationary front and rear frame parts, such as the axle supporting housings, of vehicles of varying wheel base dimensions.

Each of the end cross beams 59 of the dolly are provided with inwardly extending angle brackets 78 which, in turn, rotatably support a pair of transversely spaced, horizontally disposed guide wheels 79. The spacing between the guide wheels 79 closely approximates the width of the guide rails 30 which are positioned axially and centrally within each of the stalls 23, and a single longitudinally extending guide rail 80 carried centrally upon the floor of the elevator platform 36. The various transverse cross members of the dolly frame are appropriately slotted or recessed to provide ample clearance for the guide rails 80 and 30. Thus, it will be seen, that the guide wheels 79 function to constrain movement of the dolly in a straight line path to and from the elevator platform, and additionally serve as a means for bringing the guide rail 80 carried on the movable elevator platform into substantially exact axial alignment with the relatively stationary guide rails 30 positioned in the individual parking stalls, and upon the floors of the loading and unloading stations 27 and 28 of the garage structure. While the operator of the elevator and dolly, purely by visual reference, is enabled to bring the guide rail 80 of the elevator into relatively close axial alignment with any one of the guide rails 30 of the parking stalls, the outwardly flaring arrangement of the guide wheels 79, nevertheless, serves as an additional alignment means between the stationary guide rails 30 and the guide rail 80 of the elevator platform, as the dolly is propelled to and from the elevator platform 36.

Pressure fluid for actuating the jack cylinders 72, the feeler cylinders 73 and the extension cylinders 75 of the dolly is supplied and returned to and from the dolly by means of three flexible conduits or hoses 81 connected to the dolly on the side thereof opposite the hoses 53. As in the case of the hoses 53, the hoses 81 are connected to the dolly structure by means of swivel-type connectors 82 and preferably have their intermediate portions wound about and retained upon suitable spring-actuated take-up reels 81a carried by the elevator apparatus below the platform 36, in order to prevent entanglement of the hoses 81 with the dolly structure and ground wheels thereof during movement of the dolly to and from the elevator platform.

Figure 12:
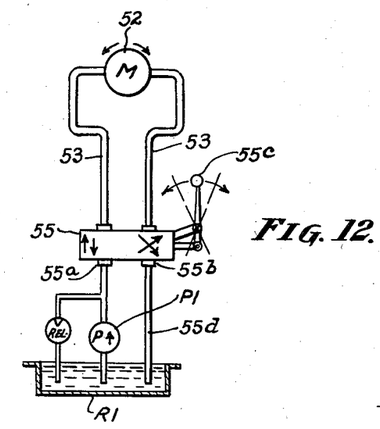
Fig. 12 is a diagram of the fluid pressure-actuated drive circuit for propelling the vehicle-handling and transferring dolly.

The hydraulic control circuit for the dolly propelling motor 52 is shown diagrammatically in Fig. 12 of the drawings. Movement of the dolly to and from either side of the elevator platform 36 is accomplished by selective actuation of the reversing valve 55. The valve 55 is supplied with pressure fluid by the pump P1, and exhausts fluid to the reservoir R1 by way of the exhaust conduit 55d. The valve 55 is of the three-position type and is provided with an actuating handle 55c which, when occupying a neutral position, as shown in full lines in Fig. 12, serves to trap fluid within the conduits 53 and motor 52 to preclude rotation of the motor. When the valve handle 55c is shifted leftwardly, as shown in Fig. 12, pressure fluid from the pump P1 is directed through one of the lines 53 to drive the motor 52 in rotation in one direction, with fluid being exhausted from the motor to the reservoir R1 through the opposite conduit 53. When it is desired to move the dolly in the opposite direction, the handle 55c is shifted toward its rightward position as shown in Fig. 12, whereupon pressure fluid from the pump P1 is directed through the opposite conduit 53 and to the opposite side of the motor 52, while fluid is exhausted through the other conduit 53 to the reservoir R1. Thus, by appropriate actuation of the single valve handle 55c, the operator is enabled to cause the dolly to move, for example, off of the elevator platform 36, to a position under or beneath the chassis of an automobile or other vehicle parked at the loading station 27, or within any one of the parking stalls 23. During such movement, the dolly is guided in a straight line path by means of the guide rail 80 carried on the elevator platform 36 and the guide rails 30 positioned centrally of the loading and unloading stations 27—28 and the floors 29 of the individual parking stalls 23.

Figure 13:
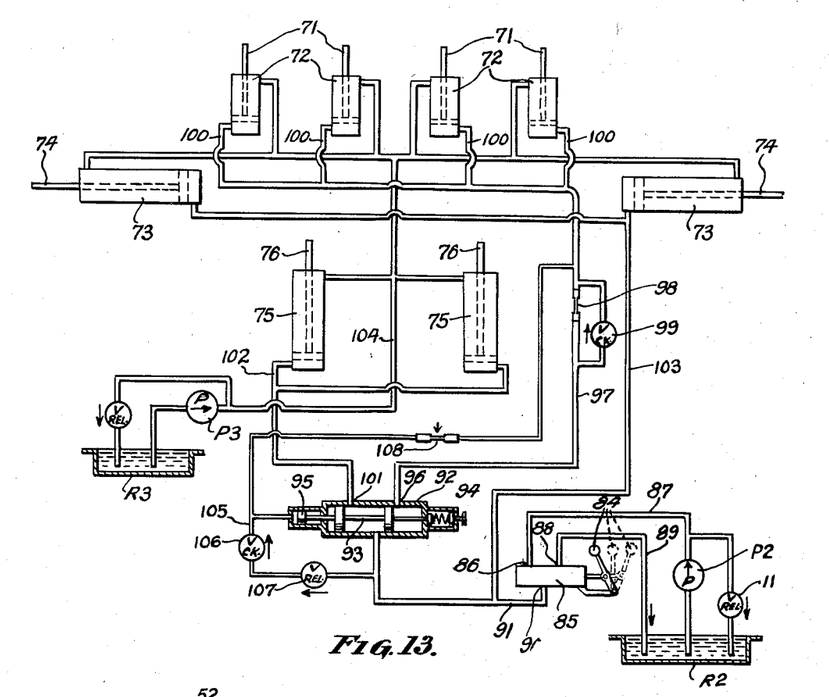
Fig. 13 is a similar view illustrating the fluid pressure control circuit for effecting the automatic raising and lowering of the vehicle.

The hydraulic control circuit for the jack or lift cylinder 72, the feeler cylinder 73 and the jack frame extending cylinders 75 is illustrated diagrammatically in Fig. 13 of the drawings. This latter control circuit is of a semiautomatic type whose operation is controlled by manipulation of the single handle element 84 of a three-position, three-way reversing valve 85. Pressure fluid for extending or advancing the various hydraulic motors or rams 72, 73 and 75 is supplied by a high pressure pump P2 connected to receive fluid from the reservoir R2. A relatively lower pressure pump P3 which is connected to receive fluid from the reservoir R3 is utilized to constantly supply low pressure to the retracting areas of the motors 72, 73 and 75.

The outlet of the pump P2 is connected with the inlet port 86 of the valve 85 by means of a conduit 87. The valve 85 is provided with an exhaust port 88 connected with the reservoir R2 through the conduit 89. The motor or outlet port 90 of the valve 85 is connected through the line 91 with a servomotor-type, three-way valve 92 provided with an axially shiftable spool-type valve element 93 connected to be shifted leftwardly, as shown in Fig. 13, by means of a coil compression spring 94, and arranged to be shifted in an opposite direction in response to a given high pressure acting upon the pressure face of a servomotor 95 connected with the opposite side of the spool member 93. The valve 92 has a first inlet-outlet port 96 communicating with a manifold conduit 97 in which is interposed a fixed choke 98. Disposed in bypassing relation to the choke 98 is a check valve 99 arranged to open in a direction away from the valve 92. The manifold conduit 97 communicates with the piston-advancing sides of each of the jack or lift cylinders 72, by means of branch conduits 100. The valve 92 is provided with a second motor or outlet port 101 which is connected with the piston-advancing areas of the jack-extending rams or motors 75, as by means of the branched conduit 102. The feeler cylinders or rams 73 have their piston-advancing areas connected by means of a branched conduit 103 directly with the conduit 91 leading from the outlet port 90 of the control valve 85.

The pressure outlet of the low pressure pump P3 is connected to constantly supply low pressure fluid to the ram-retracting areas of the lift cylinders 72, the feeler cylinders 73 and the jack-extending cylinders 75. This latter connection is made by means of the manifold conduit 104 having appropriate branch conduits leading therefrom to the retracting areas of each of the cylinders 72, 73 and 75. Pressure fluid for the servomotor 95 of the valve 92 is supplied through a branched pilot line 105, one side of which contains a check valve 106 and an adjustable pressure relief valve 107, and is connected with the conduit 91 to receive fluid under a predetermined high pressure from the conduit 91. The opposite branch of the pilot line 105 communicates with the manifold conduit 97 beyond the choke 98 and check valve 99, and has interposed therein a variable restricter or choke valve 108.

In operation, assuming that it is desired to transfer an automobile or similar automotive vehicle from the loading station 27, or one of the stalls 23 onto the elevator platform 36 for subsequent movement or from one of the parking stalls or the unloading station 28, the operator brings the elevator platform 36 into desired horizontal and lateral alignment with the loading station 27 or the desired parking stall 23, through the proper manipulation of the controls for the elevator mechanism, not shown. Following alignment of the elevator platform with the parked vehicle, the operator moves the control handle 55c of the valve 55 to a position to cause pressure fluid to pass to one side of the hydraulic motor 52, to thus cause driving rotation of the traction wheels 43 of the dolly, and to propel the latter outwardly from one side of the elevator to a position beneath the frame of the associated vehicle. When the dolly reaches an approximately central location beneath the vehicle, the control handle 55c is returned to its neutral position, thus stopping the dolly in a desired, approximate centralized, position beneath the vehicle.

Figure 10:
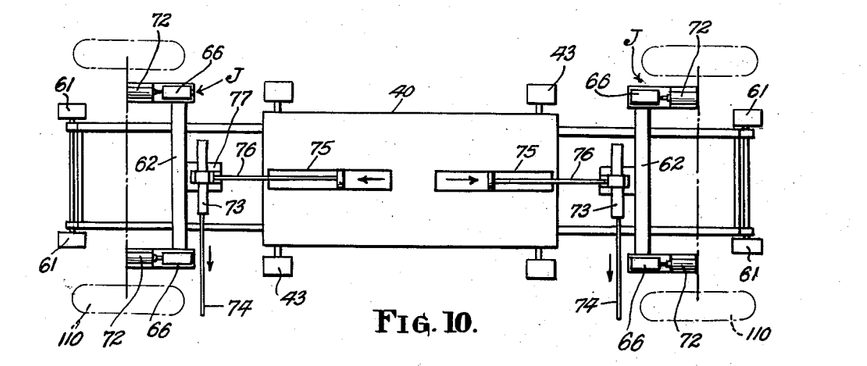
Fig. 10 is a similar view showing the wheel base-determining feeler mechanism extended for engagement with the tires or wheels of the vehicle.

Next, the operator shifts the control handle 84 for the valve 85 from its neutral position leftwardly, as viewed in Fig. 13, thus connecting the outlet of the high pressure pump P2 with the conduit 91. High pressure fluid then flows from the valve 85 through conduit 91, and manifold conduit 103 into the advancing areas of the feeler cylinders 73, thus causing advancing movement on the part of the feeler rods 74 to a position laterally outwardly of the dolly, and beyond the normal outer boundaries of the dolly, and into the plane of the front and rear wheels 110 of the vehicle, as illustrated particularly in Fig. 10. At the same time, high pressure fluid from the pump P2 is directed to the valve 92 which, by reason of the spring 94 and the absence of high pressure fluid at the servomotor 95, is shifted to a position to establish communication between the lines 91 and 102, thus introducing pressure fluid to the advancing areas of the jack frame-extending cylinders 75. As the piston rods 76 of the cylinders 75 move outwardly, the jack frames 62 are extended in unison relative to the central frame or chassis 40 of the dolly. The feeler arms 74, having now reached their extended positions, are carried in unison with the jack frames 62 until the feeler arms 74 reach and contact the outer peripheries of the tires of the front and rear wheels 110 of the associated vehicle, on the lower sides thereof. Contact of the feeler rods 74 with the vehicle wheels 110 stops further advancing movement on the part of the jack frames 62, thus creating a resistance in the advancing circuit of the cylinders 75 which results immediately in a build-up of pressure within the line 91. This increase in pressure within the line 91 is transmitted to the pressure relief valve 107 connected in the pilot line 105 for the servomotor 95, and once a predetermined high pressure within the line 91 is reached, the pressure relief valve 107 opens to supply high pressure fluid to the advancing side of the servomotor 95, thus shifting the valve member 93, against the resistance of the spring 94, to its opposite position. Fluid within the jack extending cylinders 75 and the associated conduit 102 is now trapped by the valve 92, and communication is established between the conduit 91 and the manifold conduit 97 leading to the advancing areas of the jack or lift cylinders 72. High pressure fluid now passes from the pump P2 to the advancing areas of the lift cylinders 72, extending the piston rods 71 and elevating the lift pads 66 through the scissors linkage defined by the levers 63 and 68.

Due to a predetermined spaced relationship between the feeler rods 74 and the lift pads 66 of the jack assemblies, such lift pads are assured of proper and desired vertical alignment with relatively stationary frame components of the vehicle, such as the rear axle housing and the front spring housings of the vehicle frame, when the feeler rods 74 are brought into contact with the peripheral surfaces of the front and rear vehicle wheels 110. Thus, the jack assemblies are elevated to bring the lift pads 66 into balanced, four point contact with the frame of the vehicle, adjacent the four wheels thereof, to elevate the vehicle bodily to free the wheels thereof from contact with the associated floor or ground surface. By visual reference, the operator will note the proper elevation of the vehicle, and when so elevated, releases or returns the control handle 84 to its neutral position. Neutralization of the control handle 84 serves to trap high pressure fluid within the various lines or conduits leading to the advancing areas of the cylinders 72, 73 and 75, and pressure fluid from the pump P2 is automatically released through a high pressure relief valve 111 upon closing or neutralizing the valve 85. At the same time, advancing pressure is retained at the servomotor 95 of the valve 92, by reason of the check valve 106 and the communication of the pilot line 105 with the advancing areas of the lift cylinders 72.

Next, the control handle 55c is shifted so as to direct pressure fluid from the pump P1 to the side of the motor 52 to cause the dolly and the now elevated vehicle to be propelled onto the elevator 36. When the dolly and the vehicle supported thereon reach a central position on the elevator platform 36, the operator neutralizes the valve handle 55c to stop the dolly, and thereafter the elevator platform is either elevated or lowered and moved horizontally to a desired position of registry with any one of the parking stalls 23, or with the unloading station 28.

To transfer the dolly-supported vehicle from the elevator platform 36 to a selected parking stall 23, or to the unloading station 28, the control handle 55c is again actuated in the direction of desired movement of the dolly and the same is propelled by the hydraulic motor 52 off of the elevator platform 36 and onto the floor surface of the stall 23, or the unloading station 28. When the dolly and its supporting vehicle clear the elevator platform, movement of the dolly is then arrested by neutralizing the control handle 55c and then by resort to the control handle 84, the operator is enabled to lower the vehicle and deposit the same upon the floor of the particular parking stall 23 or at the unloading station 28.

To lower the vehicle, the control valve 84 is shifted rightwardly, as viewed in Fig. 13, to connect the conduit 91 with the exhaust line 89. This latter connection permits fluid within the advancing area of the feeler cylinders 73 to be exhausted through the conduits 103, 91, the valve 85, and exhaust line 89, it being understood that the retracting areas of the feeler cylinder 73, as well as the retracting areas of the other cylinders, are at all times connected with the low pressure fluid discharged from the pump P3. At the same time, the conduit 97 which is still maintained in communication with the conduit 91 through the valve 92 is now connected to exhaust. However, the choke 98 restricts and retards the flow of fluid outwardly from the advancing areas of the lift cylinders 72, thus causing the lift cylinders to retract, and the vehicle to descend, at a relatively slow speed. During the descent of the vehicle, the weight of the vehicle itself, together with the low pressure fluid from the pump P3, act together to retract the lift cylinders 72 until the wheels or tires of the vehicle contact the floor surface. At this point, the lift pads 66 of the jack assemblies continue to descend, and the lift cylinders 72 continue to retract, but only under the influence of the low pressure fluid from the pump P3. The restriction placed within the conduit 97 by the choke 98 causes sufficient pressure to be maintained within the pilot line 105 to keep the servomotor 95 in an advanced position against the action of the spring 94.

However, when the pistons of the lift cylinders 72 reach a finally retracted position and are no longer displacing fluid through the conduit 97, the pressure within the line 97 drops to zero, thus permitting the pressure within the pilot line 105 to be dissipated through the restrictor valve 108 to an extent where the spring 94 will once again shift the valve member 93 to its left hand position, thus permitting fluid to be exhausted from the advancing areas of the jack-extending cylinders 75 by way of the conduit 102, valve 92, conduit 91, valve 85, and conduit 89. Pressure fluid from the low pressure pump P3 then causes the jack-extending cylinders 75 to retract, thus retracting the jack-supporting frames 62 inwardly toward the central chassis or frame 40 of the dolly. Following retraction of the frames 62, the control handle 84 is released or returned to a neutral position, and the dolly returned to the elevator platform 36 in readiness for a subsequent vehicle-handling and transfer operation.

In view of the foregoing, it will be seen that the present invention provides an improved vehicle-handling and transferring dolly or carriage apparatus for use in mechanical parking garage systems. The vehicle handling and transferring apparatus of the present invention is characterized by its ease and speed of operation, and its ability to safely and expeditiously elevate, transport and lower an associated vehicle without dragging or pushing the vehicle over the ground or floor surface, thus eliminating possible attendant damage to the vehicle and the garage structure. Further, through use of an all hydraulic control system, the present vehicle-handling and transfer apparatus is enabled to function substantially automatically in properly positioning or aligning the jack devices with the proper frame components of an associated vehicle, and in lifting and lowering such vehicle through contact with such frame components, thus minimizing the possibility of damage to the vehicle underpinnings and associated accessories therefor.

While a single preferred embodiment of the invention has been illustrated and disclosed in detail, it will be understood that various modifications as to details of construction and design may be resorted to without departing from the spirit of the invention or the scope of the following claims.

I claim:

1. Vehicle-handling and transfer apparatus for mechanical parking garages comprising a relatively low, elongated, self-propelled carriage arranged to be propelled to a position beneath a vehicle and between the ground wheels thereof; a plurality of relatively spaced vehicle-lifting devices carried by said carriage for movement longitudinally thereof between relatively extended and retracted positions, each of said lifting devices being movable in a vertical plane to engage a frame component of a vehicle under which said carriage is positioned and to lift the vehicle bodily from an associated supporting surface; means carried by said carriage for moving said lifting devices relatively apart; means carried for movement with said lifting devices and engageable with the wheels of a vehicle during movement of said lifting devices toward relatively extended positions; and means responsive to the engagement of said last-named means with the wheels of the vehicle for automatically arresting further movement of said lifting devices relatively apart and for moving each of said lifting devices vertically upwardly to positions of elevating engagement with the vehicle.

2. A vehicle-handling and transfer dolly for mechanical parking garages comprising a relatively elongated, wheel-mounted frame; drive means carried by said frame for driving the wheels thereof in rotation, whereby to propel said frame beneath a vehicle from either end of the latter; a plurality of vertically extensible jack devices mounted on said frame toward opposite ends thereof for movement between relatively longitudinally retracted and extended positions; jack-extending means operable to move said jack devices upwardly with respect to said frame; means to move said jack devices between said longitudinally retracted and extended positions; feeler means carried in association with each of said jack devices and operable during movement of the latter from said longitudinally retracted position toward said extended position to engage front and rear wheels of a vehicle under which said frame is positioned; and means responsive automatically to the engagement of said feeler means with the wheels of the vehicle to arrest further relative extension movement of said jack devices and to operate said jack-extending means.

3. A vehicle-handling and transfer dolly as defined in claim 2, wherein said feeler means comprises a feeler element movable between laterally extended and retracted positions relative to said frame; and means connected with said feeler element for moving the latter from its retracted position to its extended position.

4. A vehicle-handling and transfer dolly as defined in claim 2, wherein said drive means for propelling said frame, said jack-extending means, said means to move said jack devices between relatively longitudinally retracted and extended positions, and said feeler means all comprise fluid-pressure-responsive motors.

5. A vehicle-handling and transfer dolly for mechanical parking garages comprising a relatively elongated, low, rectangular frame of a size to fit beneath an automotive vehicle between opposite side wheels thereof; traction wheels supporting said frame; reversible hydraulic motor means for driving said traction wheels and thereby to propel said frame beneath a vehicle; a pair of jack-supporting members carried in relatively spaced relation on said frame for movement longitudinally thereof between relatively extended and retracted positions; first fluid-pressure-actuated means connected to move said jack-supporting members between said relatively extended and retracted positions; fluid-pressure-actuated jack devices carried on each of said jack-supporting members and operable to lift a vehicle under which said frame is positioned; a feeler device carried for movement with each of said jack-supporting members and arranged for movement between laterally extended and retracted positions with respect to said frame; means for moving said feeler devices to their extended positions upon movement of said jack-supporting members from a retracted position toward an extended position, said feeler devices, when occupying their extended positions, being engageable during extending movement of said jack-supporting members with front and rear wheels of a vehicle under which said frame is positioned; and means communicating with said first fluid-pressure-actuated means and with said fluid-pressure-actuated jack devices and operable automatically in response to the engagement of said feeler devices with the wheels of a vehicle for arresting operation of said first fluid-pressure-actuated means and for operating said jack devices.

6. A vehicle-handling and transfer dolly as defined in claim 5, wherein said means for moving said feeler devices comprise fluid-actuated rams carried by said jack-supporting members in longitudinally inwardly spaced relation to said jack devices, and wherein said last-named means comprises a valve having connections with said first fluid-pressure-actuated means and said jack devices and operable in response to a predetermined rise in pressure at said first fluid-pressure-actuated means, occasioned by engagement of said feeler devices with the wheels of a vehicle, to arrest the flow of fluid to and from said first fluid-pressure-actuated means and to direct pressure fluid to said jack devices.

7. A vehicle-handling and transfer dolly for mechanical parking garages comprising a relatively elongated, flat frame formed with a plurality of vertically articulated sections and arranged to fit beneath an automotive vehicle between opposite side wheels thereof; traction wheels supporting said frame; a reversible motor carried by said frame and drivingly connected with said traction wheels, said motor being operable to propel said frame over a supporting surface and beneath an associated automotive vehicle; a pair of jack-supporting members slidably carried on said frame for movement between longitudinally extended and retracted positions; hydraulic motor means connected with said members for moving the latter between said extended and retracted positions; hydraulic jack devices carried on each of said members and operable to engage and elevate an automotive vehicle under which said frame is positioned; a laterally extensible feeler carried by each of said members in predetermined spaced relation to said jack devices, said feelers being engageable with front and rear wheels of a vehicle under which said frame is positioned during movement of said members toward extended positions; and means responsive to engagement of said feelers with the front and rear wheels of such vehicle for automatically arresting further movement of said jack-supporting members toward their extended positions and for operating said jack devices to elevate the vehicle.

References Cited in the file of this patent

UNITED STATES PATENTS

| | | |
|---|---|---|
| 1,502,350 | Patrick et al. | July 22, 1924 |
| 1,584,517 | Dinkelberg | May 11, 1926 |
| 1,962,127 | Balkema et al. | June 12, 1934 |
| 1,996,673 | Callison | Apr. 2, 1935 |
| 2,626,065 | Sanders et al. | Jan. 20, 1953 |
| 2,785,809 | Riblet | Mar. 19, 1957 |